United States Patent [19]
Allen, Sr.

[11] 3,936,670
[45] Feb. 3, 1976

[54] PORTABLE LIGHT
[76] Inventor: Harry Emitt Allen, Sr., 2584 Crape Myrtle St., Shreveport, La. 71108
[22] Filed: Oct. 29, 1074
[21] Appl. No.: 518,570

[52] U.S. Cl. ............ 240/41.3; 240/52.2; 240/61.12
[51] Int. Cl.² ........................................ F21V 13/04
[58] Field of Search ....... 240/8.14, 8.16, 8.18, 52.2, 240/61.11, 61.12, 106.05, 41, 41.3, 41.35

[56] References Cited
UNITED STATES PATENTS

| | | | |
|---|---|---|---|
| 1,479,578 | 1/1924 | Anderson | 240/61.12 X |
| 1,772,439 | 8/1930 | Garbs | 240/52.2 X |
| 1,928,431 | 9/1933 | Morshead et al. | 240/41.3 |
| 2,064,253 | 12/1936 | Fortney | 240/41.5 X |
| 2,199,014 | 4/1940 | Stitt | 240/46.01 |
| 2,218,678 | 10/1940 | Hoffman | 240/41.35 X |
| 2,275,299 | 3/1942 | Hummert | 240/61.12 X |
| 2,512,623 | 6/1950 | Ferguson | 240/41.35 X |
| 2,611,834 | 9/1952 | Simons | 240/8.18 X |
| 3,170,636 | 2/1965 | Nordquist | 240/41.35 R X |

Primary Examiner—L. T. Hix
Assistant Examiner—Alan Mathews

[57] ABSTRACT

A portable light which includes a light assembly mounted on a reel by means of a swivel mount, which reel is equipped with a suction cup to enable positioning of the light on the dash or other smooth surface of a motor vehicle. The swivel mount is designed to permit the light beam to be adjusted while the light is positioned on such a smooth surface by means of the suction cup. The light is capable of being moved into substantially any position by the user and the cord may be wound and unwound on the reel as desired. The light is particularly capable of being used for reading maps and effecting emergency repairs to a motor vehicle, and is adapted to be plugged into the cigarette lighter of the vehicle for such use.

4 Claims, 7 Drawing Figures

U.S. Patent  February 3, 1976  3,936,670
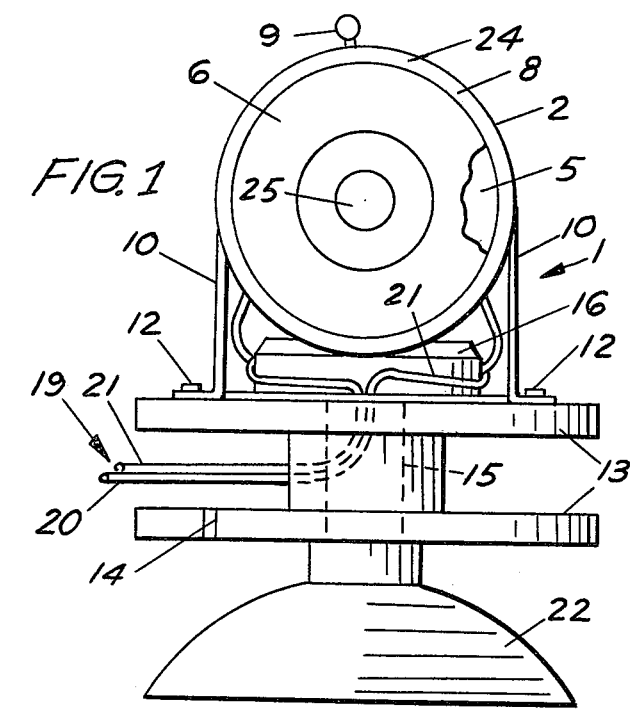
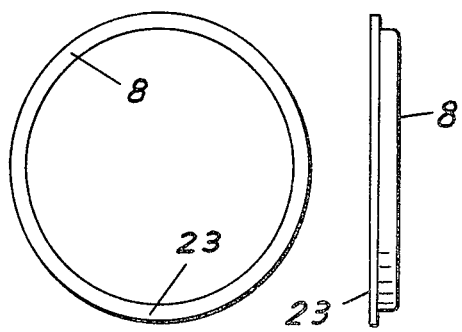
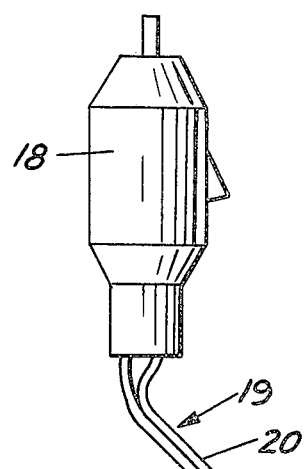
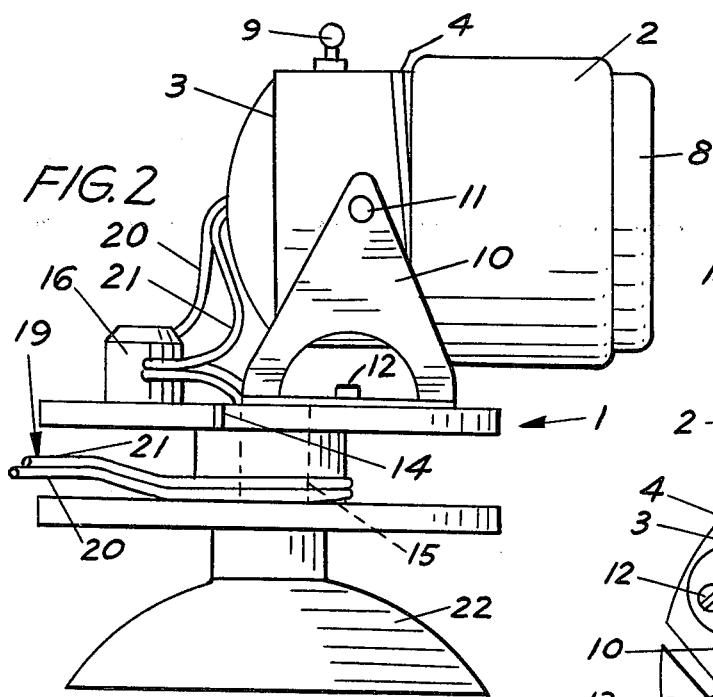
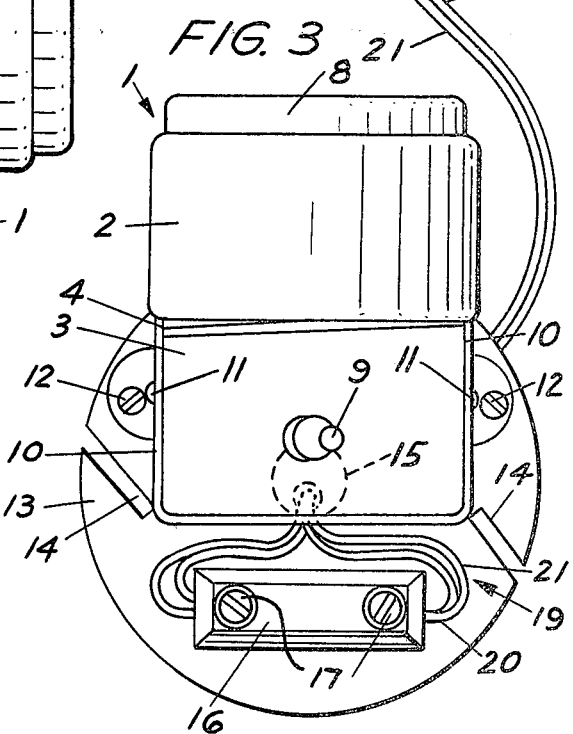
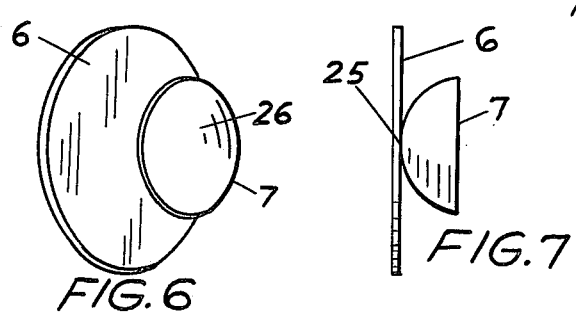
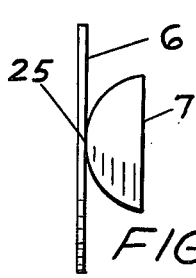

PORTABLE LIGHT

BACKGROUND OF THE INVENTION

1. Field of the Invention

This invention relates to a new and improved light, and particularly, a new and improved portable light which can be used in motor vehicles for interior illumination and emergency repair work. For example, the light of this invention is equipped with a suction cup and reel arrangement whereby the light can be affixed temporarily to substantially any smooth surface such as an automobile fender, and the cord unwound from the reel to the degree necessary to plug the unwound cord into a vehicle cigarette lighter. The device can also be used to illuminate the interior of a vehicle and is compact and easily stored when not in use.

2. Description of the Prior Art

Heretofore, various types of portable lights have been developed for various purposes in the prior art. Such a light is described in U.S. Pat. No. 2,275,299 to Robert H. Hummert, which patent discloses a portable spot lamp having a handle and a rubber suction cup for removable attachment to a smooth surface such as the window of an automobile. While the lamp disclosed by this patent is equipped with a handle for easy manipulation, it provides no mechanism by which the cord can be easily stored and unwound to facilitate use of the light at a distance from the power source. Furthermore, the light is so designed as to throw a wide beam when turned on, and would therefore be unsuitable for use in an automobile or other vehicle for doing close work such as reading a map or the like, since it would produce a substantial glare. Yet another disadvantage of such a lens design, which permits a wide but relatively short range beam, is the difficulty of locating objects at a distance from the vehicle in the dark, since the beam is not designed to penetrate the darkness to an effective degree. A still further shortcoming of prior art portable lamps such as that illustrated in the patent, is the inability of a user to manipulate the light after it is once positioned by means of the suction cup in a particular location on an automobile or other smooth surface, without repositioning the suction cup. Thus, in order to focus the beam to a precise position after the lamp is positioned on a desired surface, the suction cup must be de-activated, and the lamp removed and again repositioned.

Accordingly, it is an object of this invention to provide an improved portable light equipped with a suction cup for positioning the light on substantially any smooth surface, and a reel for convenient winding and unwinding of the cord supplying power to the light.

Another object of this invention is to provide a portable light which is equipped with a beam concentrator and improved lens reflector which serve to increase the beam distance, concentrate the light and to permit glare-free use of the light inside a vehicle for map reading and other work requiring interior illumination of the vehicle.

A still further object of the invention is to provide an improved portable light which can be plugged into the cigarette lighter of an automobile or other vehicle, moved to various locations outside of the vehicle by unwinding the power cord from a reel attached to the light, positioned by means of a suction cup attached to the reel to substantially any smooth surface of the vehicle, and manipulated by means of a swivel attachment to multiple beam positions while mounted in the same location on the vehicle.

Another object of the invention is to provide a compact, lightweight, portable light equipped with a reel for storing the power cord, which light and cord can be easily and conveniently stored when not in use.

Yet another object of the invention is to provide a portable light equipped with a reel and suction cup and fitted with an improved beam concentrator and lens reflector, the latter of which not only enables the light to be used for map reading, and the like, without glare, but also provides an exceptionally intense beam at long distances from the light.

SUMMARY OF THE INVENTION

These and other objects of the invention are provided in a portable light which includes the following elements.

1. A light assembly, including a front and rear cover, a switch, a beam concentrator and a lens reflector;
2. A reel adapted to receive a supply of electric cord which provides power to the light, and carrying a swivel mount upon which the light assembly is mounted; and
3. A suction sup mounted on the bottom portion of the reel and adapted to secure the reel and light assembly to a selected smooth, uniform surface.

BRIEF DESCRIPTION OF THE DRAWING

The invention will be better understood in view of the following description presented with reference to the accompanying drawing:

FIG. 1 of the drawing is a front elevation of the portable light of this invention;

FIG. 2 is a right side view of the light illustrated in FIG. 1;

FIG. 3 is a top view of the light illustrated in FIGS. 1 and 2;

FIG. 4 is a front elevation of the beam concentrator illustrated in FIGS. 1–3;

FIG. 5 is a side elevation of the beam concentrator illustrated in FIGS. 1–4;

FIG. 6 is a perspective view of the lens reflector mounted on the lens of the light of this invention; and FIG. 7 is a side elevation of the lens reflector and lens illustrated in FIG. 6.

DESCRIPTION OF THE PREFERRED EMBODIMENTS

Referring now to FIGS. 1–3 of the drawings, the portable light of this invention, generally illustrated by reference numeral 1, is shown with forward cover 2 and rear cover 3 communicating by means of rear cover threads 4, more particularly illustrated in FIG. 2. Forward cover reflector 5 is mounted in the interior of forward cover 2, while lens 6, carrying lens reflector 7 by means of lens reflector base 25, and beam concentrator 8, are maintained in position by means of forward cover flange 24 when forward cover 2 is screwed onto rear cover threads 4. As more particularly illustrated in FIG. 4 of the drawing, beam concentrator 8 is equipped with beam concentrator lip 23 which is adapted to engage forward cover flange 24 when forward cover 2 mates with rear cover 3. Lens reflector 7 is adapted to mount on lens 6 and is positioned with lens reflector concave surface 26 facing forward cover reflector 5 to reflect light from the bulb or filament (not illustrated) mounted in the rear of forward cover 2, back onto forward cover reflector 5, to concentrate the light beam. Rear cover 3 is mounted onto swivel frame 10 by means of swivel frame pins 11, and the light may accordingly be tilted up and down as desired to focus the beam on a particular area. Swivel frame 10 is attached to reel 13 by means of swivel frame screws 12, and reel 13 is designed to carry a supply of electrical cord 19. Electrical cord 19 carries first plug wire 20 and second plut wire 21, which initially communicate with a resistor (not illustrated) located in resistor container 16, and ultimately, through reel aperture 15 in reel 13, with a light bulb or filament and ground tap (not illustrated) located in rear cover 3. The resistor is designed to maintain a substantially equal voltage on the light bulb or filament in the event of voltage surges to plug 18 from a racing engine, and may be removed from resistor container 16 by removing resistor container screws 17.

Referring again to FIGS. 1–3 of the drawing, suction cup 22 is mounted on the bottom of reel 13 and is adapted to securely mount on any smooth surface such as a fender or window of an automobile or other motor vehicle. Switch 9 operates to turn the light on and off, and, as illustrated, electrical cord 19 can be wound on and off of reel 13, as desired. Reel slots 14 serve to retain electrical cord 19 in wound position on reel 13.

Referring now to FIGS. 4 and 5 of the drawing, beam concentrator 8 is affixed to forward cover 2 by means of beam concentrator lip 23 and forward cover flange 24, as heretofore described. Beam concentrator 8 is designed to perform two basic functions in the portable light of this invention. First of all, it serves as a "beam shield" to minimize scattering of light when the portable light is used for reading maps and in other functions requiring glare-free illumination of the interior of a car or other vehicle. Thus, the beam concentrator prevents glare when the light source is placed close to an object or objects to be illuminated. The beam concentrator is also useful in "channelling", and therefore intensifying, the beam when it is desired to focus the light beam on an object at a distance from the light source. Whereas the prior art lamps produce a beam which scatters the light, beam concentrator 8 serves to minimize such scattering and permit sharp focus on distant objects as well as glare-free focus on objects close to the light source. It has surprisingly been found that beam concentrator 8 need not project beyond about one-fourth of an inch from lens 6, in order to be effective. One skilled in the art would logically conclude that if a tight beam concentration was desired, a long, tunneled beam concentrator would be necessary; however, the beam concentrator of this invention has proved very effective.

Referring now to FIGS. 6 and 7 of the drawing, lens reflector 7 is illustrated, with lens reflector base 25 adapted to adhere to lens 6 by means of lens reflector base 25, as illustrated. Lens reflector concave surface 26 is spherically dish-shaped in order to reflect maximum light, and is designed to reflect light received from the light source and reflect it back upon forward cover reflector 5. This results in an intensified beam of light, concentrated by the action of beam concentrator 8, which effects superior illumination of objects at a distance from the light source.

It will be recognized that the portable light of this invention is susceptible of a variety of uses. The light can be used to good advantage as a "trouble light" for illuminating various work areas of an automobile or other vehicle, including watercraft, in the event of mechanical malfunction. For example, a primary use of the light can be made to change tires at night. The light can be positioned at an appropriate point on the automobile fender, the cord unwound and plugged into the cigarette lighter by means of plug 18, and the light adjusted by means of the swivel mount to focus the beam precisely on the work area. After completion of the work, the cord can be rewound on the reel and the light stored in a convenient place in the vehicle for future use.

Similarly, since the light is designed to minimize glare and facilitate illumination at close proximity to the light source, it can be used for such activities as reading maps at night, night fishing, and other activities requiring glare-free and long range illumination in the dark.

The beam concentration and superior lens reflecting embodiments of the invention combine to result in an improved light which projects a beam having exceptionally good darkness penetration characteristics. For example, the light can be adapted for dry cell power and used as a hunting light with far superior beam focus on distant objects than prior art lights. Furthermore, in the event of an emergency, the light beam can be seen at far greater distances than conventional lights of comparable size and powered by the same sources.

It will be apparent to those skilled in the art that use of the resistor in the light circuit of this invention is an improvement in the art. Such use insures that a substantially constant voltage will at all times be applied across the light bulb or filament, and this action promotes bulb life. Accordingly, use of the inventive portable light in automobiles or other vehicles having a generator or alternator where the output voltage to the cigarette lighter is subject to fluctuation results in no shorter bulb life than in lights used with constant voltage sources.

Having described my invention with the particularity set forth above, what is claimed is:

1. A portable light comprising:
  a. a light source;
  b. a cylindrically shaped forward cover carrying said light source in the interior thereof and a cylindrically shaped rear cover mating with said forward cover in threaded relationship;
  c. a forward cover reflector mounted in the interior of said forward cover;
  d. a flat, circular lens removably carried by said forward cover;
  e. a cylindrically shaped beam concentrator in cooperation with said lens and said forward cover;
  f. a concavo-convex lens reflector mounted on said lens with the concave surface of said reflector facing said light source, and adapted to reflect light from said light source back onto said forward cover reflector and intensify said light;
  g. a swivel frame carried by said rear cover in pivoting relationship;
  h. an external, horizontally disposed reel in cooperation with said swivel frame and adapted to receive a supply of electric cord thereon in wound fashion; and
  i. a suction cup carried by said reel and adapted to removably adhere to smooth, substantially uniform surface.

2. The portable light of claim 1 further comprising: a. a resistor in electrical cooperation with said light source a power source to provide an essentially constant voltage to said light source; and b. at least one slot in said reel adapted to receive said electric cord whereby said electric cord can be prevented from unwinding from said reel.

3. The portable light of claim 2 wherein said reel is fitted with an aperture to accommodate said electric cord and facilitate communication of one end of said electric cord from the interior of said reel to said light source.

4. The portable light of claim 3 further including switch means in cooperation with said light source for controlling power to and from said light source.

* * * * *